(12) United States Patent
Lee

(10) Patent No.: US 8,988,364 B2
(45) Date of Patent: Mar. 24, 2015

(54) DISPLAY DEVICE AND INPUT DEVICE

(75) Inventor: Jung Mok Lee, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 744 days.

(21) Appl. No.: 12/908,759

(22) Filed: Oct. 20, 2010

(65) Prior Publication Data
US 2011/0037726 A1    Feb. 17, 2011

(30) Foreign Application Priority Data

Apr. 23, 2008  (KR) .................. 10-2008-0037821

(51) Int. Cl.
*G06F 3/041*    (2006.01)
(52) U.S. Cl.
CPC ................................. *G06F 3/0414* (2013.01)
USPC ....................................................... 345/173
(58) Field of Classification Search
USPC ................................................ 345/173–178
See application file for complete search history.

(56) References Cited

U.S. PATENT DOCUMENTS

| 2003/0085882 | A1 | 5/2003 | Lu | |
| 2004/0124765 | A1 | 7/2004 | Iwase | |
| 2005/0030728 | A1* | 2/2005 | Kawashima et al. | 362/31 |
| 2005/0052428 | A1* | 3/2005 | Hayashi et al. | 345/173 |
| 2006/0146033 | A1 | 7/2006 | Chen et al. | |
| 2007/0222762 | A1* | 9/2007 | Van Delden et al. | 345/173 |

FOREIGN PATENT DOCUMENTS

| CN | 1497419 A | 5/2004 |
| CN | 1577385 A | 2/2005 |
| CN | 1582453 A | 2/2005 |
| CN | 1800928 A | 7/2006 |
| CN | 1303508 C | 3/2007 |

* cited by examiner

*Primary Examiner* — Dennis Joseph
(74) *Attorney, Agent, or Firm* — Birch, Stewart, Kolasch & Birch, LLP

(57) ABSTRACT

Disclosed is a display device. The display device includes: a touch panel; a display panel in close contact with the lower surface of the touch panel; and a plurality of sensors arranged under the touch panel and configured to sense a pressure which is applied to the touch panel. The display device can improve the picture quality by bring the touch panel into close contact with the display panel. Also, the display device can input a signal, such as a touch or others, by sensing a pressure, which is applied to the touch panel, using the sensors.

5 Claims, 6 Drawing Sheets

DISPLAY DEVICE AND INPUT DEVICE

TECHNICAL FIELD

The present disclosure relates to a display device and an input device.

BACKGROUND ART

The development of information processing techniques makes flat display devices, such as liquid crystal display (LCD) devices, active matrix organic light emission diode (AMOLED) devices, plasma display panels (PDPs) and so on, to be widely distributed.

Also, touch screens configured to easily input signals are being ordinarily used, as graphic user interface (GUI) systems are further developed and populated.

Such touch screens are implemented in a variety of manners such as a resistive film type, a capacitive type, an optical sensing type, a surface acoustic wave type, an electro-magnetic type, a vector force type, or others.

DISCLOSURE

Technical Problem

Embodiments of the present description are to provide a display device and an input device which are adapted to easily input a signal such as by a touch or others, improve image quality, and to be reinforced against physical impacts.

Technical Solution

A display device according to an embodiment of the present description includes: a touch panel; a display panel in close contact with the lower surface of the touch panel; and a plurality of sensors arranged under the touch panel and configured to sense a pressure which is applied to the touch panel.

The display device further includes a mold frame configured to accommodate the display panel. In this case, the sensors are interposed between the touch panel and the mold frame.

The display device further includes a cushion member interposed between the display panel and the mold frame and configured to have elasticity.

The display device further includes a pressure conductor configured to expand from the touch panel and to transfer the pressure to the sensors.

The display device allows the height of the pressure conductor to become larger than the thickness of the display panel.

The display device enables the pressure to be applied to the sensors via the display panel.

The display device further includes a cushion member interposed between the display panel and the sensors.

A display device according to another embodiment of the present description includes: a touch panel; a display module in close contact with the touch panel; a case configured to accommodate the display module; and a plurality of sensors configured to sense a pressure applied to the touch panel.

The display device further includes an elastic member interposed between the case and the display module.

The display device allows the case to include: an outer frame disposed the outer side of the touch panel and display module; a first supporter formed to expand from the outer frame and to support the sensors; and a second supporter formed to expand from the first supporter, placed under and separated from the display module.

The display device allows not only the sensors to be interposed between the case and the display module, but also the pressure to be transferred to the sensors via the display module.

An input device according to still another embodiment of the present description includes: a transparent window; a display panel placed under and integrated with the window; and a plurality of sensors arranged under the window and configured to sense a pressure which is applied to the window.

The input device allows the sensors to be arranged around the display panel.

The input device allows the sensors to be arranged under the display panel.

The input device further includes a transparent resin interposed between and closely contacted with the window and the display panel.

Advantageous Effects

The display device according to an embodiment includes a touch panel and a display panel in close contact with each other. The touch and display panels adhere closely to each other by an adhesive layer interposed between the two panels. The adhesive layer includes a resin and so on.

As such, an air layer existing between the touch and display panels is eliminated. Therefore, the display device can prevent the deterioration of brightness and the distortion of an image. As a result, the display device can improve the image quality.

Also, the adhesive layer can have elasticity. Therefore, the damage of the display panel caused by a pressure which is applied through the touch panel can be prevented.

Moreover, when an external pressure by a touch or others is applied, the touch and display panels are movable as a single body. As such, the pressure by the touch or others is transferred to sensors.

At this time, each of the sensors senses the transferred pressure and allows an input position of a signal such as a touch or others to be calculated.

Therefore, the display device according to an embodiment of the present description can easily input an external signal.

Furthermore, the display panel is provided with a cushion member. The cushion member reduces an impact applied to the display panel.

Therefore, the display device according to an embodiment of the present description is reinforced against an external physical impact.

BEST MODE

Figure 1:
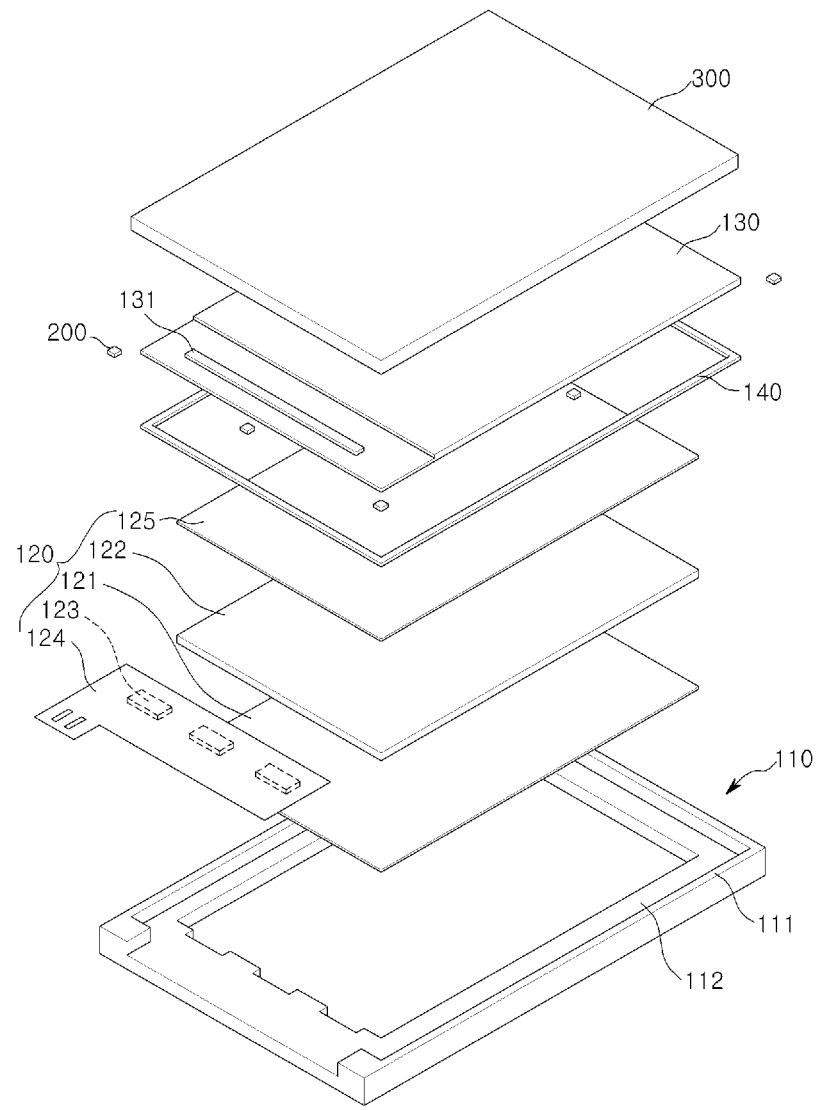
FIG. 1 is a disassembled perspective view showing an LCD device according to a first embodiment of the present description.

In the description of embodiments, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings. In the drawings, the sides of elements can be exaggerated for clarity, but they do not mean the practical sizes of elements.

Figure 2:
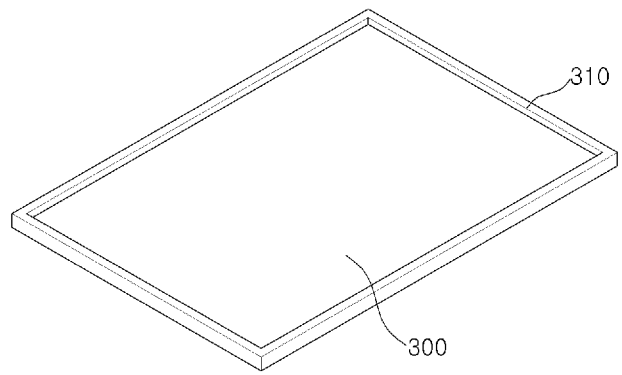
FIG. 2 is a perspective view showing the rear surface of a touch panel and a pressure conductor.
Figure 3:
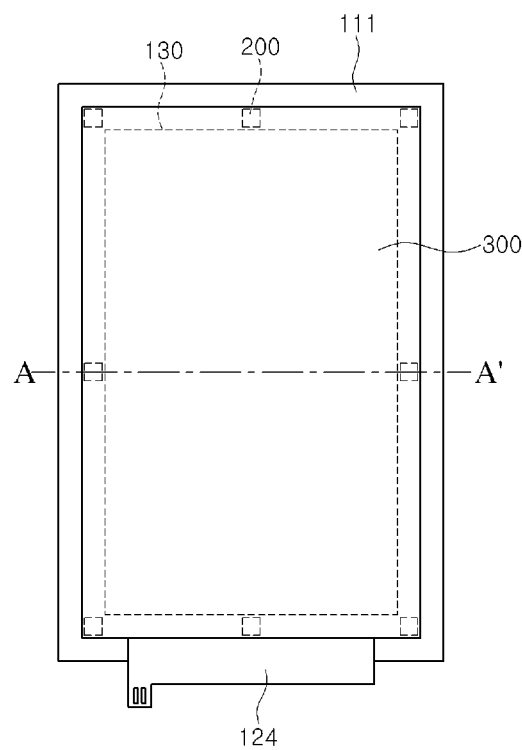
FIG. 3 is a planar view showing an LCD device according to a first embodiment.
Figure 4:
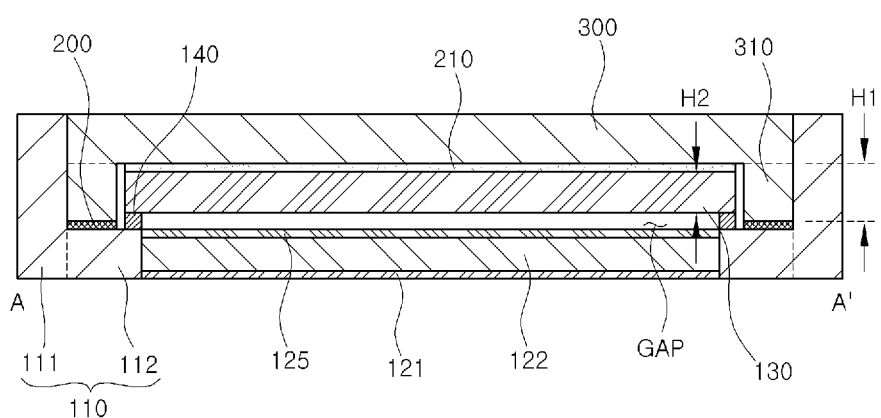
FIG. 4 is a cross-sectional view showing a sectional surface taken along a line A-A' in FIG. 3.

FIG. 1 is a disassembled perspective view showing an LCD device according to a first embodiment of the present description. FIG. 2 is a perspective view showing the rear surface of a touch panel and a pressure conductor. FIG. 3 is a planar view showing an LCD device according to a first embodiment. FIG. 4 is a cross-sectional view showing a sectional surface taken along a line A-A' in FIG. 3.

Referring to FIGS. 1 through 4, the LCD device includes a mold frame 110, a backlight assembly 120, a liquid crystal panel 130, an adhesive layer 210, a cushion member 140, pressure sensors 200, a touch panel 300, and a pressure conductor 310.

The mold frame 110 accommodates the backlight assembly 120, the liquid crystal panel 130, the cushion member 140, the pressure sensors 200, the touch panel 300, and the pressure conductor 310.

The mold frame 110 can be formed from plastic or others. Also, the mold frame 110 includes an outer frame 111 and a supporter 112.

The outer frame 111 is disposed to surround side surfaces of the backlight assembly 120 and liquid crystal panel 130. To this end, the outer frame 111 is formed in a rectangular rim shape. In other words, the outer frame 111 includes four side walls united into a single body.

The support 112 has a step height in respect to the out frame 111. The supporter 112 is formed to expand from the inner side surface of the out frame 111. Also, the supporter 112 is formed in a single body united with the outer frame 111. Such a supporter 112 is used to support the touch panel 300.

The backlight assembly 120 is disposed in the inner side of the supporter 112. Such a backlight assembly 120 generates light and guides light toward the liquid crystal panel 130. To this end, the backlight assembly 120 includes a reflection sheet 121, a light guide plate 122, light emission diodes (LEDs) 123, and an optical sheet 125.

The reflection sheet 121 reflects light generated by the LEDs 123 toward an upward direction.

The light guide plate 122 is disposed on the reflection sheet 121. The light guide plate 122 guides incident light from the LEDs 123 toward the upward direction.

The LEDs 123 are mounted on a ductile circuit board 124. Also, the LEDs 123 are arranged on a side surface of the light guide plate 122. Such LEDs 123 emit light toward the light guide plate 122.

The optical sheet 125 is disposed on the light guide plate 122. Also, the optical sheet 125 improves the characteristics of light passing through it. Such an optical sheet 125 may be a diffusion sheet or a prism sheet. Furthermore, a polarizing sheet can be in close contact with the liquid crystal panel 130.

The liquid crystal panel 130 includes a thin film transistor (TFT) substrate, a color filter substrate, and a liquid crystal layer interposed between the two substrates. The liquid crystal panel 130 further includes polarizing sheets disposed to be in close contact with the upper surface of the TFT substrate and the lower surface of the color filter substrate.

The liquid crystal panel 130 is disposed on the backlight assembly 120. Also, the liquid crystal panel 130 is disposed on the supporter 112. This liquid crystal panel 130 controls the intensity of light passing through each pixel and displays an image.

Such a liquid crystal panel 130 is in close contact with the touch panel 300. More specifically, the liquid crystal panel 130 adheres closely to the lower surface of the touch panel 300 by the adhesive layer 210. In other words, the liquid crystal panel 130 is integrated with the touch panel 300 into a single body. As such, the liquid crystal panel 130 together with the touch panel 300 can move as a single body.

The adhesive layer 210 is formed from a transparent resin. The adhesive layer 210 is interposed between the liquid crystal panel 130 and the touch panel 300. More specifically, the adhesive layer 210 adheres closely to the upper surface of the liquid crystal panel 130 and the lower surface of the touch panel 300.

The adhesive layer 210 can have a refractive index corresponding to the touch panel 300. Also, the adhesive layer 210 prevents direct contact between the liquid crystal panel 130 and the touch panel 300.

Furthermore, the adhesive layer 210 has elasticity. As such, the adhesive layer 210 can absorb impacts and others which are applied from the touch panel 300. Therefore, the adhesive layer 210 can protect the liquid crystal panel 130.

Such an adhesive layer 210 can be formed from any one of a photo-curable resin, a thermo-curable resin, a thermoplastic resin, and others.

The cushion member 140 is interposed between the liquid crystal panel 130 and the supporter 112. The cushion member 140 has elasticity. As such, the cushion member 140 prevents a collision between the supporter 112 and the liquid crystal panel 130.

As an example of the cushion member 140, any one of a tape and a non-woven fabric which both have elasticity can be used. Such a cushion member 140 attaches the liquid crystal panel 130 to the mold frame 110.

Consequently, the liquid crystal panel 130 and the touch panel 300 are attached to the mold frame 110. As such, the liquid crystal panel 130 and the touch panel 300 can be relatively movable with respect to the mold frame 110.

The pressure sensors 200 are arranged on the supporter 112. Also, the pressure sensors 200 are placed under the touch panel 300.

Furthermore, the pressure sensors 200 are interposed between the pressure conductor 310 and the supporter 112. The pressure sensors 200 are used to sense pressures which are applied to the touch panel 300 and others and are transferred by the pressure conductor 310.

To this end, the pressure sensors 200 are arranged around the liquid crystal panel 130. In other words, the pressure sensors 200 positioned under the touch panel 300 are arranged opposite the edges of the touch panel 300.

As a pressure sensor 200, any one of a piezoelectric element, a load cell, a capacitor and so on can be employed. The piezoelectric element generates a current signal in correspondence with an externally applied pressure. The load cell has a varying resistance along the pressure. The capacitor has a varying capacitance along the pressure.

Since current signal, resistance and capacitance can be measured, the pressures applied to the touch panel 300 can be sensed by means of the pressure sensors 200.

Although it is not shown in the drawings, the LCD device according to a first embodiment of the present description can further includes a circuit board connected to the pressure sensors 200. The circuit board transfers the signals output from the pressure sensors 200 to a system or others.

The touch panel 300 is disposed in the inner side of the outer frame 111 and on the liquid crystal panel 130. Also, the touch panel 300 is disposed to cover the pressure sensors 200.

The touch panel 300 adheres closely to the liquid crystal panel 130 by means of the adhesive layer 210. The touch panel 300 is formed in a plate shape and from a reinforced plastic, glass, or others. Alternatively, the touch panel 300 can be formed from a mixture or a combination of glass and a reinforced plastic.

The touch panel 300 can function as a transparent window protecting the liquid crystal panel, because it is externally exposed.

The pressure conductor 310 is interposed between the touch panel 300 and the pressure sensors 200. The pressure conductor 310 is formed to extend from the touch panel 300 in a downward direction. Also, the pressure conductor 310 is formed in a single body united with the touch panel 300.

Alternatively, the pressure conductor 310 can be formed in a suitable shape which is attached to or combined with the touch panel 300.

Also, the pressure conductor 310 is used to transfer a pressure applied to the touch panel 300 toward the pressure sensors 200.

The thickness H1 of the pressure conductor 310 is larger in comparison with the thickness H2 of the liquid crystal panel 130. More specifically, the thickness H1 pressure conductor 310 is larger than the total thickness which is obtained by adding the thickness H2 of the liquid crystal panel 130 and the thickness of the adhesive layer 210.

The pressure conductor 310 is disposed on the edges of the touch panel 300 opposite to the pressure sensors 200. Also, the pressure conductor 310 has a rectangular rim shape.

In a different manner, the pressure conductor 310 can be replaced with a plurality of protrusions. The plurality of protrusions is formed to protrude from the lower surface of the touch panel 300 and to face the pressure sensors 200.

Consequently, the touch panel 300 is supported by mean of the supporter 112, the pressure sensors 200 and the pressure conductor 310.

In accordance therewith, a pressure applied to the touch panel 300 is transferred to the pressure sensors 200 by the pressure conductor 310.

At this time, each of the pressure sensors 200 senses a magnitude of the transferred pressure. As such, a position touched on the touch panel 300 can be detected by analyzing the magnitudes of the pressures transferred to the pressure sensors 200

More specifically, each of the pressure sensors 200 converts the magnitude of the transferred pressure into an electric signal and applies the converted electric signal to the system via the circuit board. The system calculates a magnitude ratio among the converted electric signals and derives a touched position or a signal input position from the calculated magnitude ratio using a previously prepared algorithm.

If the central position of the touch panel 300 is touched in order to input a signal, a pressure caused by touching the touch panel 300 is uniformly transferred to all the pressure sensors. As such, the pressure sensors 200 sense pressures of the same magnitude. Therefore, it can be detected that the touch signal is input at the central position of the touch panel 300.

In other words, any one of the pressure sensors 200 adjacent to a touched portion of the touch panel 300 senses a pressure with a high magnitude and the others far from the touched portion of the touch panel 300 sense pressures with relative low magnitudes. Therefore, the system can detect the touched position on the touch panel 300 by analyzing the sensed signals.

When the touch panel is touched, the liquid crystal panel 130 is protected by the adhesive layer 210 and cushion member 140.

Also, the liquid crystal panel 130 is not damaged by a collision with the backlight assembly 120 when a touch signal is applied to the touch panel 300. This results from the fact that a gap is formed between the optical sheet 125 and the liquid crystal panel 130.

In other words, the gap is provided as a shelter space or a buffering space of the liquid crystal panel 130 when the liquid crystal panel 130 integrated with the touch panel 300 moves as a single body.

The liquid crystal panel 130 is in close contact with the touch panel 300. The touch panel 300 is supported by the supporter 112. The thickness H1 of the pressure conductor 310 is larger in comparison with the thickness H2 of the liquid crystal panel 130.

Therefore, though the supporter 112 and the liquid crystal panel 130 are applied with a very low pressure to each other, the liquid crystal panel 130 is not damaged by the very low pressure.

Moreover, the liquid crystal panel 130 and the backlight assembly 120 are hard to make collide with each other. Therefore, the liquid crystal panel 130 is prevented from a damage caused by a collision with the backlight assembly 120.

Furthermore, the liquid crystal panel 130 adheres closely to the touch panel 300 by means of the adhesive layer 210. As such, any air layer is not formed between the liquid crystal panel 130 and the touch panel 300.

Therefore, the display device according to a first embodiment of the present description can prevent a phenomenon in which an image displayed on the liquid crystal panel 130 is refracted by the air layer or others.

As a result, the LCD device according to a first embodiment of the present description can improve the picture quality.

Figure 5:
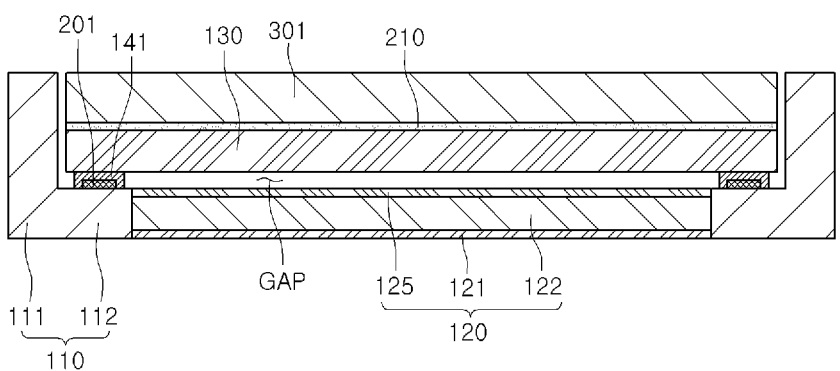
FIG. 5 is a cross-sectional view showing a sectional surface of the LCD device according to a second embodiment of the present description.

FIG. 5 is a cross-sectional view showing a sectional surface of the LCD device according to a second embodiment of the present description. The LCD device of the second embodiment has the same configuration as that of the previous embodiment, with exception to a modified cushion member and pressure sensors. The explanation for the LCD device of the second embodiment overlapping with that of the previous embodiment will be omitted. In other words, the modified components included in the LCD device of the second embodiment will be described in detail.

Referring to FIG. 5, pressure sensors 201 are arranged under a liquid crystal panel 130. The pressure sensors 201 are interposed between the liquid crystal panel 130 and a mold frame 110. Also, the pressure sensors 201 are arranged on a supporter 112. Furthermore, the pressure sensors 201 are arranged around a backlight assembly 120.

A cushion member 141 is disposed under the liquid crystal panel 130. The cushion member 141 can be formed in a planar structure of a closed loop shape. As such, the cushion member 141 can surround the backlight assembly 120.

Such a cushion member 141 is interposed between the liquid crystal panel 130 and the mold frame 110. Also, the cushion member 141 is interposed between the liquid crystal panel 130 and the pressure sensors 201. More specifically, the cushion member 141 is disposed to encompass the pressure sensors 201. In other words, the cushion member 141 is placed to cover the upper and side surfaces of the pressure sensors 201.

A pressure applied to a touch panel 301 is transferred to the pressure sensors 201 via the liquid crystal panel 130. More specifically, the pressure applied to the touch panel 301 is transferred to the pressure sensors 201 via the liquid crystal panel 130 and the cushion member 141.

The LCD device according to a second embodiment of the present description can sense a signal, such as a touch, transferred via the cushion member 141, without damaging the liquid crystal panel 130. Also, the LCD device of the second embodiment can remove the pressure conductor described in that of the first embodiment.

Therefore, the LCD device according to a second embodiment of the present description is reinforced against external physical impact. Also, the LCD device can be easily manufactured because it includes the touch panel with a simplified structure.

Figure 6:
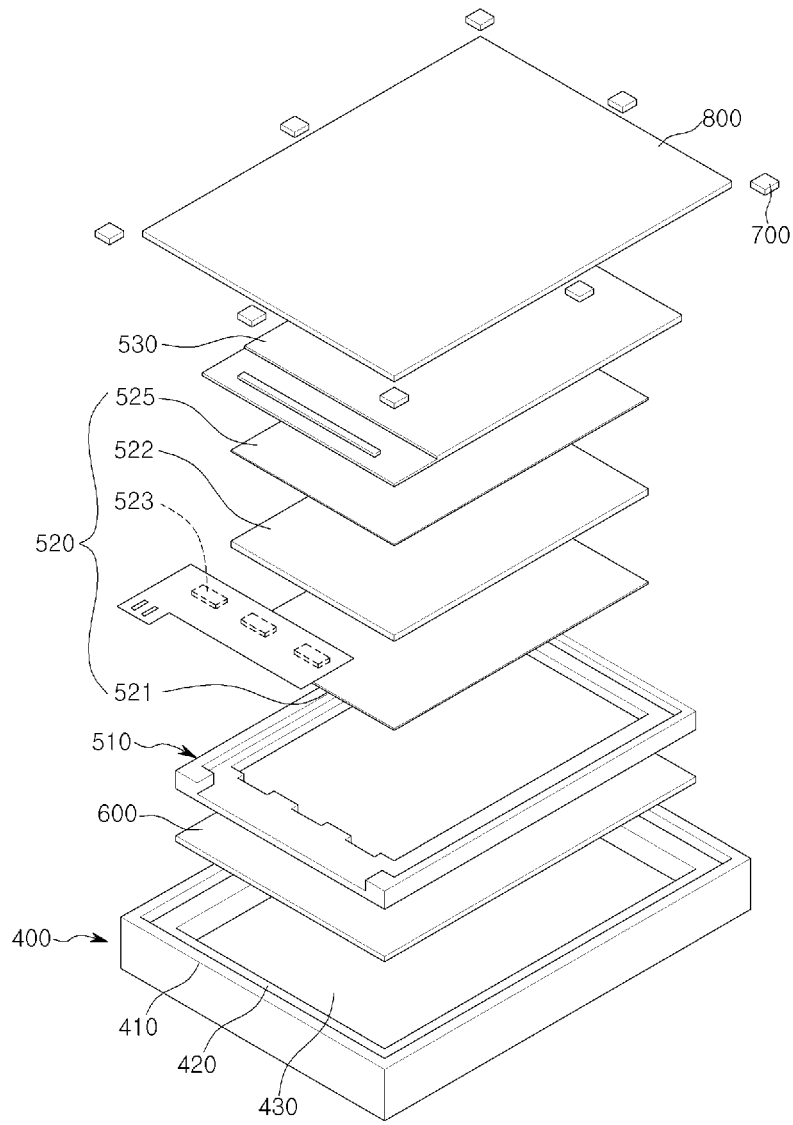
FIG. 6 is a disassembled perspective view showing an LCD device according to a third embodiment of the present description.
Figure 7:
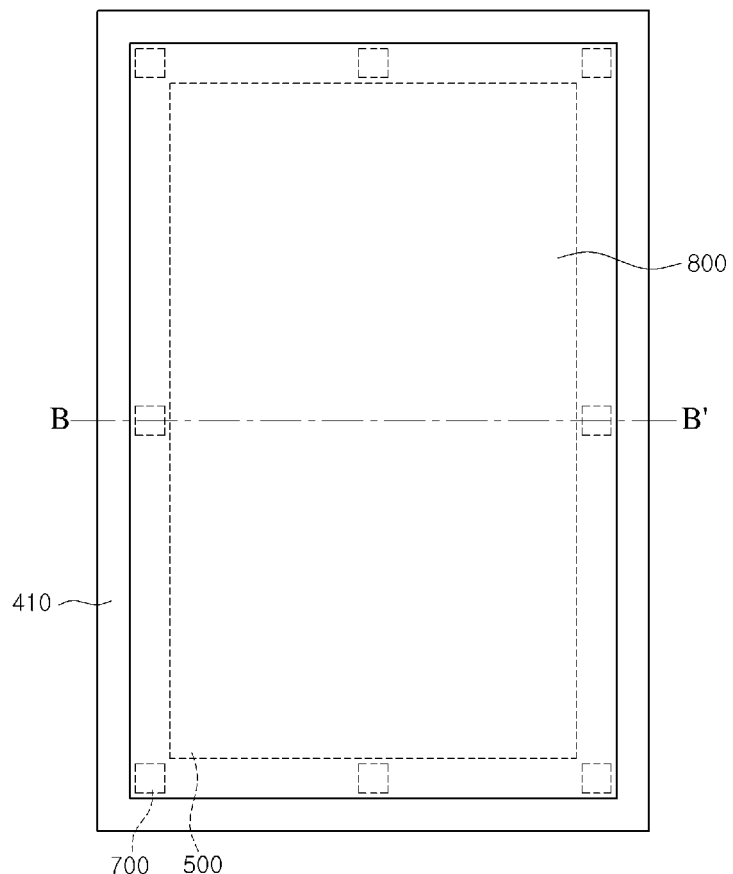
FIG. 7 is a planar view showing the LCD device according to a third embodiment of the present description.
Figure 8:
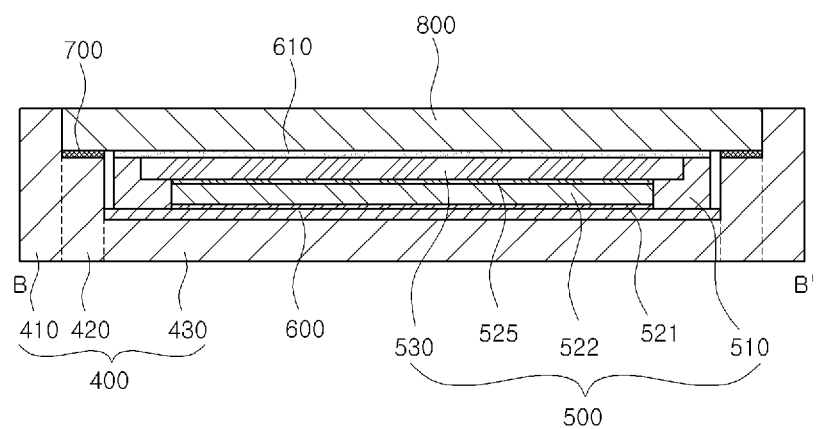
FIG. 8 is a cross-sectional view showing a sectional surface taken along a line B-B' in FIG. 7.

FIG. 6 is a disassembled perspective view showing an LCD device according to a third embodiment of the present description. FIG. 7 is a planar view showing the LCD device according to a third embodiment of the present description. FIG. 8 is a cross-sectional view showing a sectional surface taken along a line B-B' in FIG. 7. The LCD device of the third embodiment has the same configuration as that of the previous embodiments, with exception to modified components. The explanation for the LCD device of the third embodiment overlapping with those of the previous embodiments will be omitted.

Referring to FIGS. 6 through 8, the LCD device includes a case 400, an LCD module 500, an adhesive layer 610, a cushion member 600, pressure sensors 700, and touch panel 800.

The case 400 receives the LCD module 500, the cushion member 600, the pressure sensors 700, and the touch panel 800.

Such a case 400 includes an outer frame 410, a first supporter 420 and a second supporter 430.

The outer frame 410 is disposed on the side surfaces of the LCD module 500 and touch panel 800. This outer frame is formed in a rectangular rim shape.

The first supporter 420 expands from the inner side surfaces of the outer frame 410 and forms a step height with respect to the outer frame 410. This first supporter 420 is disposed on the side surfaces of the LCD module 500 and under the touch panel 700.

Such a first supporter 420 is formed in a single body united with the outer frame 410.

The second support 430 expands from lower portions of the inner side surface of the first supporter 420. This second supporter 430 is formed in a single body integrated with the first supporter 420.

The second supporter 430 is placed under the LCD module 500.

The LCD module 500 is disposed in the inner side of the first supporter 420. This LCD module 500 includes a mold frame 510, a backlight assembly 520, and a liquid crystal panel 530.

The mold frame 510 accommodates the backlight assembly 520 and the liquid crystal panel 530.

The backlight assembly 520 outputs light toward the liquid crystal panel 530. To this end, the backlight assembly 520 is configured to include a reflection sheet 521, a light guide plate 522, LEDs 523, and an optical sheet 525.

The liquid crystal panel 530 is disposed on the backlight assembly 520. Also, the liquid crystal panel 530 is positioned at the inner side of the mold frame 510.

Such an LCD module 500 is in close contact with the touch panel 800. More specifically, the LCD module 500 adheres closely to the touch panel 800 by means of the adhesive layer 610.

The adhesive layer 610 is interposed between the touch panel 800 and the LCD module 500. This adhesive layer 610 adheres closely to the lower surface of the touch panel 700 as well as the upper surfaces of the liquid crystal panel 530 and mold frame 510.

The cushion member 600 is interposed between the case 400 and the LCD module 500. More specifically, the cushion member 600 is interposed between the second supporter 430 and the LCD module 500.

Such a cushion member 600 absorbs impacts which are generated between and applied to the case 400 and the LCD module 500.

The pressure sensors 700 are arranged on the first supporter 420. In detail, the pressure sensors 700 are arranged around the LCD module 500.

Also, the pressure sensors 700 are placed under the touch panel 800. More specifically, the pressure sensors 700 are placed to face the edge of the touch panel 800.

The touch panel 800 is placed at the inner side of the outer frame 410 and on the pressure sensors 700. As such, the touch panel 800 is supported by the first supporter 420 and pressure sensors 700.

Also, the touch panel 800 can be formed in a plate shape and from any one of glass, plastic and so on.

When the touch panel 800 is touched, a touched position on the touch panel 800 can be detected by the pressure sensors 700.

Furthermore, the touch panel 800 can be used as a transparent window protecting the LCD module 500 from external impacts. This results from the fact that the touch panel 800 is externally exposed.

Since the LCD module 500 is in close contact with the touch panel 900 to form a single body, the liquid crystal panel 530 and the mold frame 510 is movable as a single body. In accordance therewith, the damage of the liquid crystal panel 530 caused by a collision between the liquid crystal panel 530 and the mold frame 510 can be reduced.

Similarly, the liquid crystal panel 530 and the backlight assembly 520 are movable as a single body. As such, the liquid crystal panel 530 can be protected from a damage caused by a collision with the backlight assembly 520.

Consequently, the LCD device according to a third embodiment of the present description can input a touch signal or others and improve the picture quality. Also, the LCD device of the third embodiment can reduce damage caused by an external pressure.

Figure 9:
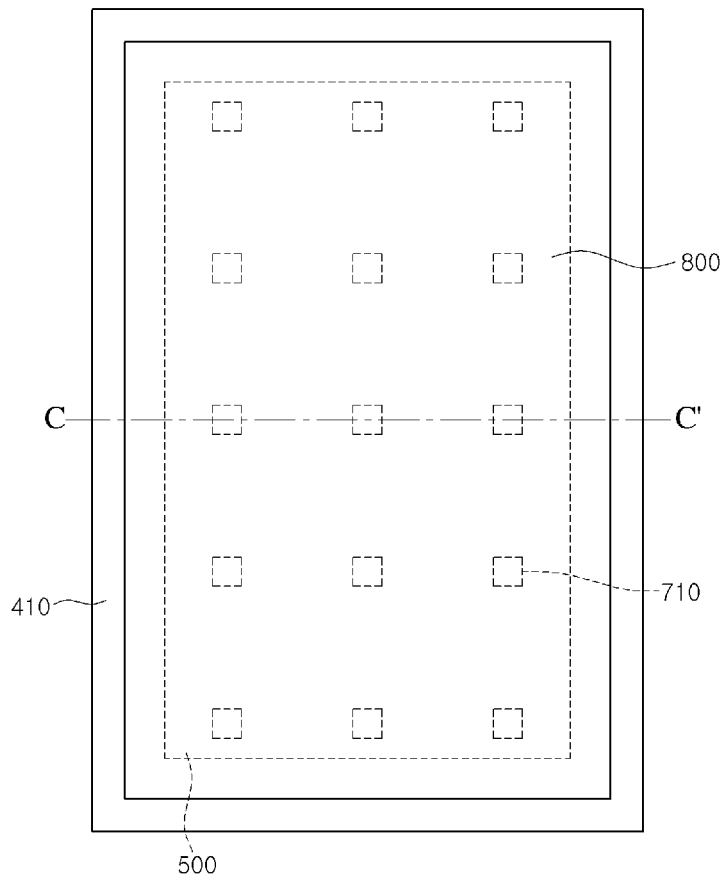
FIG. 9 is a planar view showing an LCD device according to a fourth embodiment of the present description.
Figure 10:
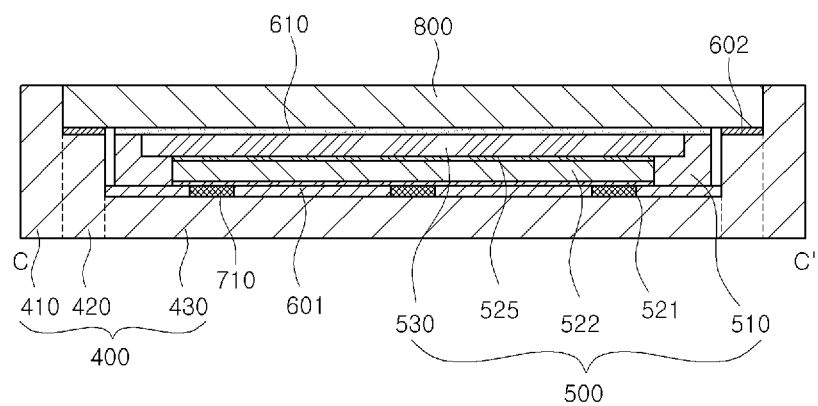
FIG. 10 is a cross-sectional view showing a sectional surface taken along a line C-C' in FIG. 9.

FIG. 9 is a planar view showing an LCD device according to a fourth embodiment of the present description. FIG. 10 is a cross-sectional view showing a sectional surface taken along a line C-C' in FIG. 9. The LCD device of the fourth embodiment has the same configuration as those of the previous embodiments, in exception with modified components. The explanation for the LCD device of the fourth embodiment overlapping with those of the previous embodiments will be omitted.

Referring to FIGS. 9 and 10, pressure sensors 710 are placed under an LCD module 500. More specifically, the pressure sensors 710 are uniformly arranged in the entire lower surface of the LCD module 500.

The pressure sensors 710 are also interposed between the LCD module 500 and a case 400. In detail, the pressure sensors 710 are arranged on a second supporter 430. In other words, the pressure sensors 710 are interposed between the LCD module 500 and the second supporter 430.

A first cushion member 601 is interposed between the case 400 and the LCD module 500. The first cushion member 601 is formed to have a plurality of recesses. Alternatively, the first cushion member 601 can be formed to have a plurality of penetration holes.

The recesses formed in the first cushion member 601 can receive the pressure sensors 710, respectively. As such, the pressure sensors 710 may be in direct contact with the LCD module 500, or in indirect contact with the LCD module 500 through the first cushion member 601.

Such a first cushion member 601 can be attached to the LCD module 500 and the second supporter 430.

A second cushion member 602 is interposed between the touch panel 800 and a first supporter 420. The second cushion member 602 can be attached to the touch panel 800 and the first supporter 420.

A pressured applied at a position on the touch panel 800 is transferred to the pressure sensors 710 via the LCD module 500. More specifically, the pressure applied at a position on the touch panel 800 can be transferred to the pressure sensors 710 via the LCD module 800 and the first cushion member 601.

Such pressure sensors 710 can be arranged on the entire surface of a screen which inputs a signal such as a touch or others.

Therefore, the display device according to a fourth embodiment of the present description can accurately sense an externally input signal.

Although embodiments have been described with reference to a number of illustrative embodiments thereof, this disclosure is not limited to those. In other words, this disclosure is presented as an example. Also, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, variations and modifications in the component parts and/or arrangements, alternative uses must be regarded as included in the appended claims.

INDUSTRIAL APPLICABILITY

The display devices according to embodiments of the present description can be applied to a display field.

The invention claimed is:

1. A display device comprising:
a touch panel;
a display panel in close contact with the lower surface of the touch panel;
a plurality of sensors arranged under the touch panel and configured to sense a pressure which is applied to the touch panel;
a mold frame configured to accommodate the display panel; a supporter formed to expand from the mold frame; a cushion member interposed between the display panel and the supporter; and
a pressure conductor configured to expand from the touch panel and to transfer the pressure to the sensors,
wherein the cushion member, the sensors and the pressure conductor are disposed on the supporter,
wherein, the plurality of sensors is arranged opposite the edges of the touch panel,
wherein, the pressure conductor is formed in a single body united with the touch panel,
wherein, the pressure conductor is arranged opposite the edges of the touch panel opposite to the pressure sensors,
wherein the height of the pressure conductor is larger than the thickness of the display panel.

2. The display device claimed as claim 1, wherein the sensors are interposed between the touch panel and the mold frame.

3. The display device claimed as claim 2, wherein the cushion member is interposed between the display panel and the mold frame and is configured to have elasticity.

4. The display device claimed as claim 1, wherein the pressure is applied to the sensors via the display panel.

5. The display device claimed as claim 4, wherein the cushion member is interposed between the display panel and the sensors.

* * * * *